United States Patent
Mazzaro et al.

(10) Patent No.: US 9,551,633 B2
(45) Date of Patent: Jan. 24, 2017

(54) SYSTEMS AND METHODS FOR IMPROVED RELIABILITY OPERATIONS

(71) Applicant: General Electric Company, Schenectady, NY (US)

(72) Inventors: Maria Cecilia Mazzaro, Greenville, SC (US); Frederick William Block, Campobello, SC (US)

(73) Assignee: General Electric Company, Schenectady, NY (US)

(*) Notice: Subject to any disclaimer, the term of this patent is extended or adjusted under 35 U.S.C. 154(b) by 612 days.

(21) Appl. No.: 14/054,307

(22) Filed: Oct. 15, 2013

(65) Prior Publication Data
US 2015/0106058 A1    Apr. 16, 2015

(51) Int. Cl.
| | | |
|---|---|---|
| *G06F 17/50* | (2006.01) | |
| *G05B 23/02* | (2006.01) | |
| *G01M 99/00* | (2011.01) | |

(52) U.S. Cl.
CPC ........ *G01M 99/005* (2013.01); *G05B 23/0251* (2013.01); *G05B 23/0283* (2013.01)

(58) Field of Classification Search
CPC .............. G01M 99/005; G05B 23/0251; G05B 23/0283; G05B 13/04; G05B 23/0227; G06Q 10/00; Y02E 20/16; F01K 13/02; F01K 23/10; F01K 23/101; F02C 6/00; F02C 9/28; F05D 2220/32; F05D 2220/72; F05D 2260/80; F05D 2270/053; F05D 2270/709; G05F 1/66

(Continued)

(56) References Cited

U.S. PATENT DOCUMENTS

| | | | |
|---|---|---|---|
| 6,217,076 B1 | 4/2001 | Howard et al. | |
| 8,972,067 B2 * | 3/2015 | Holt | ........................ G06Q 10/00 700/286 |

(Continued)

FOREIGN PATENT DOCUMENTS

| | | |
|---|---|---|
| CN | 101764405 | 6/2010 |
| EP | 0467257 | 1/1992 |

(Continued)

OTHER PUBLICATIONS

Julia V. Bukowski, Modeling and Analyzing the Effects of Periodic Inspection on the Performance of Safety-Critical Systems; p. 321-329, IEEE Transactions on Reliabilty, vol. 50, No. 3, Sep. 2001.

(Continued)

*Primary Examiner* — John H Le
(74) *Attorney, Agent, or Firm* — Fletcher Yoder, P.C.

(57) ABSTRACT

A system for improved reliability operations of a system with a heat recovery steam generator (HRSG) are presented. The system includes a processor configured to execute a model library to model a safety system. The model library includes a plurality of subsystem models each configured to derive a reliability measure. The system also includes the HRSG and an HRSG advisory system. The HRSG advisory system may be executed by the processor and is configured to receive one or more condition monitoring algorithm results, receive one or more measurements; and determine a probability of failure for the HRSG based at least in part on the one or more condition monitoring algorithm results, the one or more measurements, the model library, or a combination thereof. Moreover, determining the probability of failure includes determining a most likely state of a plurality of states of the HRSG.

18 Claims, 8 Drawing Sheets

(58) Field of Classification Search
USPC .......... 702/34, 181, 183, 184, 186; 700/286, 700/287; 703/2, 3, 7
See application file for complete search history.

(56) References Cited

U.S. PATENT DOCUMENTS

| | | | | |
|---|---|---|---|---|
| 9,158,303 | B2* | 10/2015 | Mazzaro | ............ G05B 23/0251 |
| 2006/0041459 | A1 | 2/2006 | Hester et al. | |
| 2008/0156147 | A1 | 7/2008 | Kelly et al. | |
| 2008/0228314 | A1 | 9/2008 | Sjostrand et al. | |
| 2011/0172973 | A1 | 7/2011 | Richards et al. | |
| 2013/0173231 | A1 | 7/2013 | Pandey et al. | |
| 2013/0262064 | A1 | 10/2013 | Mazzaro et al. | |

FOREIGN PATENT DOCUMENTS

| | | |
|---|---|---|
| EP | 1923825 | 5/2008 |
| EP | 2323005 A1 | 5/2011 |
| EP | 2562372 A2 | 2/2013 |
| JP | 63300358 | 12/1988 |
| JP | 05028160 | 2/1993 |
| JP | 10185768 | 7/1998 |
| JP | 11345019 | 12/1999 |
| JP | 2000322399 | 11/2000 |
| JP | 2001100822 | 4/2001 |
| JP | 2011138385 | 7/2011 |
| JP | 2004170225 | 6/2014 |
| WO | 2011088243 | 7/2011 |

OTHER PUBLICATIONS

H. Cheddie et al., Safety Instrumented Systems, Practical Probabilistic Calculations. Appendix F and G, ISA, Research Triangle Park, NC, USA, 2005.

European Search Report and Opinion issued in connection with corresponding EP Application No. 14188697.8 on Apr. 10, 2015.

* cited by examiner

SYSTEMS AND METHODS FOR IMPROVED RELIABILITY OPERATIONS

BACKGROUND OF THE INVENTION

The subject matter disclosed herein relates to operations, and more specifically, to reliability operations of systems having a heat recovery steam generator (HRSG).

Machine systems, including turbomachine systems, may include a variety of components and subsystems participating in a process. For example, a turbomachine may include fuel lines, combustors, turbine system, exhaust systems, and so forth, participating in the generation of power. The components and subsystems may additionally include a safety instrumented system (SIS) suitable for monitoring the process, and determining if the process is operating within certain safety limits. The SIS may automatically actuate certain devices, such as field devices (e.g., valves, pumps), to bring the process back into a desired safety range. However, machine systems may be complex, including numerous interrelated components and subsystems. Accordingly, recognizing or predicting a reliability of operations, such as SIS operations, may be difficult and time-consuming.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a processor configured to execute a model library to model a safety system. The model library includes a plurality of subsystem models each configured to derive a reliability measure. The system also includes a heat recovery steam generator (HRSG). The system also includes an HRSG advisory system executable by the processor and configured to receive one or more condition monitoring algorithm results, receive one or more measurements; and determine a probability of failure for the HRSG based at least in part on the one or more condition monitoring algorithm results, the one or more measurements, the model library, or a combination thereof. Determining the probability of failure includes determining a most likely state of a plurality of states of the HRSG.

In a second embodiment, a method includes predicting a plurality of state probabilities for a heat recovery steam generator (HRSG) system based at least in part on a model library, wherein the model library comprises one or more subsystem models, and each of the one or more subsystem models is configured to derive a reliability measure. The method also includes computing a system probability of failure on demand (PFD) and, if an N-step ahead estimate of the PFD exceeds a risk reduction factor (RRF), then commanding a proof test. Furthermore, the method includes outputting a proof test schedule.

In a third embodiment, a system includes a controller configured to control a machine system comprising a heat recovery steam generator (HRSG) system, and the controller is configured to receive inputs from the HRSG system. The controller includes a non-transitory computer-readable medium having instructions configured to predict a plurality of state probabilities for the HRSG system based on a model library configured to derive a reliability measure. The instructions are also configured to compute a system probability of failure on demand (PFD) and, if an N-step ahead estimate of the PFD exceeds a risk reduction factor (RRF), then commanding a proof test. The instructions are also configured to output a proof test schedule.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
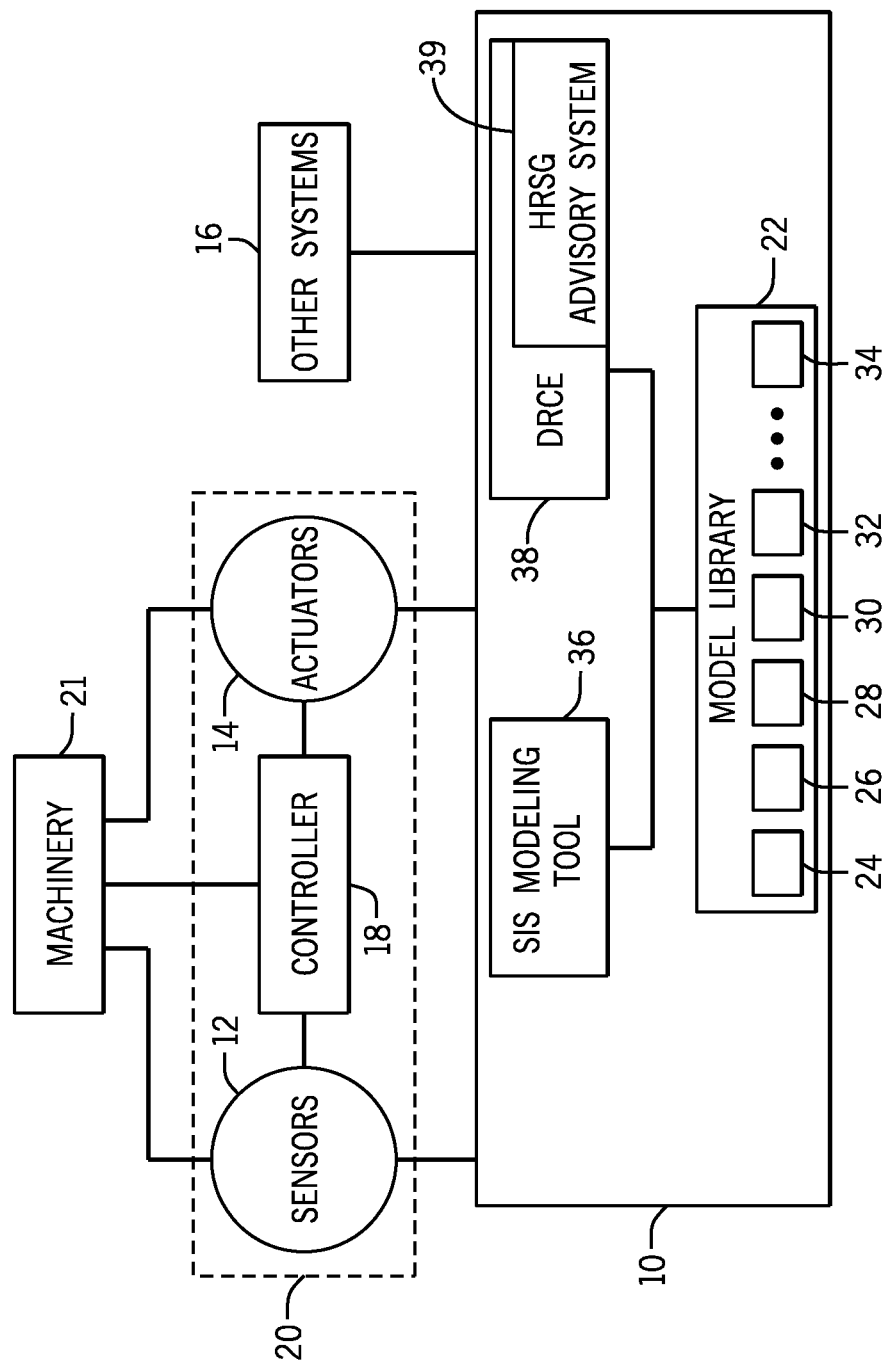
FIG. 1 is a block diagram of an embodiment of a model-based reliability system (MRS)

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

In certain embodiments, safety operations for an industrial process and associated machinery may be provided by a safety instrumented system (SIS). In these embodiments, the SIS may be implemented as one or more safety instrumented functions (SIFs). A SIF may include three main functional blocks; a sensing block providing sensors suitable for monitoring the industrial process, a logic solver block providing a controller suitable for deriving safety actions based on monitoring information provided by the sensing block, and an actuation block providing final elements (which may include flashing lights, sirens, and/or remote actuated valves) that may be driven by the logic solver block's controller to maintain the process within safe limits. By implementing the SIF on a machinery or process, such as a power generation process, undesired conditions may be detected and acted upon to maintain a desired safety integrity level (SIL). For example, the International Society of Automation (ISA) document S84.01 and the International Electrotechnical Commission (IEC) document 61508 provide for certain SIL levels (e.g., SIL 1, SIL 2, SIL 3, and SIL 4) that may be assigned to a given SIF. Higher SIL levels are correlative with improved safety. That is, a SIF using a SIL 4 is deemed more reliable than a SIF using a SIL 3, 2, or 1.

Additionally, each SIL may be correlated with or based on meeting a performance measure, such as a probability of failure on demand (PFD), mean time to failure (MTTF), mean time between failure (MTBF), safe failure fraction (SFF), hardware failure tolerance (HFT), and a risk reduction factor (RRF). For example, for processes under continuous operation, IEC 61508 defines SIL 3 as having a PFD per hour of approximately between 0.001-0.0001 and an RRF of approximately between 1,000-10,000. Accordingly, a SIF overseeing continuous operations of a continuous process may be certified as SIL 3 if the SIF can be shown to meet the aforementioned RRF or PFD. In some cases, the RRF and/or the PFD may be derived based on historical data. That is, if the SIF is allowed to operate for a certain amount of time, then the historical performance may be used to derive the RRF and/or the PFD. However, this operating history manner of derivation may take an inordinate amount of time, and may not be possible for new systems under design.

Certain modeling techniques may be used in lieu of historical observations, suitable for deriving performance measures for the SIF (e.g., PFD, RRF). For example, Fault Tree Analysis (FTA), reliability block diagrams (RBDs), risk graphs, and/or layer of protection analysis (LOPA) may be used to analyze the SIF and derive the performance measures. Additionally or alternatively, Markov models may be used to analyze the SIF. Before usage of the techniques described herein, modeling efforts focused on modeling specific systems, and the resulting models may not be reused and/or applied to other systems incorporating a heat recovery steam generator (HRSG). For example, a turbine system, such as the 9F turbine system, available from General Electric Co., of Schenectady, N.Y., may be provided in a variety of configurations with a HRSG depending on customer needs, site selection, regulatory requirements, business requirements, and so forth. Each installation of the 9F turbine may thus result in a different set of SIFs, based on the chosen HRSG configuration. Without the techniques disclosed herein, each installation may use a new model specific to the particular installation without reuse of previous models and associated data. That is, the SIFs for each installation were modeled "from scratch." It is to be noted that the techniques described herein may be used in other turbine systems, such as a 7F, 7FA, 9FA or other systems provided by General Electric Co., or by others, incorporating and HRSG.

The novel techniques described herein enable the building of a library of component models, such as libraries including HRSG models, and re-using the library to model a variety of configurations and systems, as described in more detail below. By providing for a re-usable set of models, the time and effort spent in analyzing the SIFs for a specific system configuration may be substantially reduced. Further, the models may provide for different inputs used to analyze the SIFs. For example, an online diagnosis input may be used by the models to detect and correct failures of a SIF. An output diagnosis input may be used to drive the system protected by the SIF to a safe state. This output diagnosis is typically mutually exclusive from the online diagnosis. That is, a detected failure may be used to trip the system into a safe state. A proof test input may be used, suitable to derive a more efficient proof test schedule. Likewise, a full refurbishment, input may be used to derive a more efficient restoration of the SIF to an "as new" condition. Additionally, the library of models may be used by a modeling tool that may enable the graphical manipulation of the component models to more easily analyze the specific configuration. For example, various component models may be selected from the library, and placed by the user in synchronous and/or asynchronous arrangements, to construct the desired configuration. Advantageously, the modeling tool may then automatically analyze the user-selected configuration, and derive the performance measures (e.g., PRD, RRF, SIL) and related risks.

Further, a dynamic risk calculation engine (DRCE) tool may be provided suitable for modeling certain HRSG probabilities as describe in more detail below. The DRCE may derive a risk and related performance measures for the SIF, using for example, the models (e.g., Markov models, FTA, RBD, risk graphs, LOPA) and model inputs (e.g., online diagnosis, output diagnosis, proof test optimization, full refurbishment) described herein. In one embodiment, the DRCE tool may be loaded with the user-selected SIF configuration and model input, and used to update the SIF performance measures during the SIF's lifetime. For example, the DRCE may continuously monitor SIF components, as well as related machinery (e.g., sensors, controllers, final elements), electronic logs, paper logs, operational events, maintenance events, repair events, and the like, and continuously update the SIF's performance measures. The DRCE may enable actions based on the model input, performance measure, and reliability derivations. Indeed, the DRCE may drive certain equipment to command proof tests (e.g., HRSG proof tests), drive subsystems to safe states, and or correct possible SIF failure. Additionally, the occurrence of unexpected events, such as operational events including but not limited to a turbine trip, full load rejection, overspeed events, and so forth, may be used as a performance "credit" in lieu of the occurrence of certain planed events, such as proof tests. That is, the unexpected event may be used in lieu of the scheduled test (e.g., partial proof test, full proof test). In this way, historical events may be "credited," and the SIFs performance measures updated.

Additionally, the DRCE may receive inputs, such as a component failure and repair rates, a user-selected SIF configuration, system configuration, and a desired system-level RRF. The DRCE may then simulate the passage of time by using the aforementioned component models of the model library, and provide a maintenance schedule (e.g., proof test schedule) that meets the desired RRF. Additionally, the simulation inputs may include real-time or near real-time data for a process and associated equipment, such as operational events (e.g., hours fired, temperatures, pressures, speed, flow rates, fuel usage) and/or unexpected events. These inputs may then be used to derive more accurate reliability predictions. Further, calculations performed by the DRCE may then be used as inputs into optimization systems, such as maintenance optimization systems, operational optimization systems, and/or economic optimization systems, and used to derive optimization actions (e.g., maintenance actions, operational actions, and/or economic actions). For example, by more efficiently scheduling maintenance, the simulation engine may provide for a substantial reduction in unexpected downtime, increased equipment utilization, reduced costs, and improved machinery and process efficiency.

Moreover, a heat recovery steam generator (HRSG) advisory system may be included that receives various measurements, alarms, and/or historical data pertaining to the system comprising the HRSG. The advisory system may use the input data to determine the probability of failure (e.g., reliability factor) within the HRSG according to a Markov engine. The HRSG may then be used to determine the most likely state of the HRSG. Using the most likely state, the HRSG may recommend various operations and/or maintenance based upon the state. The Markov engine may be used to model the HRSG or a model may be used to model various subsystems of the HRSG (e.g., boiler subsystem, drum regulation subsystem). The Markov chain uses various inputs, such as measured sensors, actuator commands, and feed backs, and feed forwards; software diagnostics on control loops (e.g., Closed Loop Performance Monitoring [CLPM] algorithms); hardware diagnostics (e.g., alarms) on sensors, actuators, and/or other HRSG components; and historical data detailing documented failures. Furthermore, in some embodiments, the HRSG advisory system may provide controller tuning recommendations based on the CLPM algorithms.

With the foregoing in mind and turning now to FIG. 1, the figure is a block diagram illustrating an embodiment of a model-based reliability system (MRS) 10 that may be communicatively coupled to sensors 12 and final elements 14. The MRS 10 may also be communicatively coupled to other systems 16, such as electronic logs (e.g., maintenance databases), paper logs, power production logs, manufacturer records (e.g., expected lifetime data, repair data, refurbishment data), industry records (e.g., industry failure rate data, industry standards), economic markets (e.g., power futures market, cap and trade markets, "green" credit markets), regulatory systems (e.g., regulatory compliance systems, pollution control systems), insurance systems (e.g., lost power production revenue insurance, business interruption insurance), maintenance optimization systems, operational optimization systems, economic optimization systems, and so on. The MRS 10 may be provided as a subsystem of a controller 18, and may include non-transitory machine readable media storing code or computer instructions that may be used by a computing device (e.g., the controller 18) to implement the techniques disclosed herein. In other embodiments, the MRS 10 may be included in a distributed control system (DCS), a manufacturing execution system (MES), a supervisor control and data acquisition (SCADA) system, and/or a human machine interface (HMI) system.

The sensors 12 may provide inputs to a SIF 20, and may include, for example, pressure sensors, water level sensors, temperature sensors, flow sensors, status and position indicators (e.g. limit switches, Hall effect switches, acoustic proximity switches, linear variable differential transformers (LVDTs), position transducers), and the like, connected to a machinery 21. The machinery 21 may be any type of power production machinery or component of a power production system (e.g., gas turbine system, steam turbine system, wind turbine system, hydroturbine system, combustion engine, hydraulic engine, electric generator, HRSG), and non-power production machinery (e.g., pump, valve).

As mentioned above, the SIF 20 may be used to monitor a process, such as a power generation process related to the machinery 21, to maintain the process within safety limits. Accordingly, the SIF 20 may use the sensors 12 to continuously monitor the process. A SIF 20 logic, such as a logic included in the controller 18, may then derive certain actions based on the sensor 12 inputs. For example, if a pressure measure is deemed outside of a safety range, then the SIF 20 logic may actuate one or more final elements 14 to open a pressure relief valve. Likewise, if a temperature rises above a desired temperature limit and/or below a desired minimum fluid level limit, then the SIF 20 logic may operate the final elements 14 to deliver cooling fluids. The final elements 14 may include switches, valves, motors, solenoids, positioners, and other devices, suitable for moving or controlling a mechanism or system. The SIF 20 logic may include non-transitory machine readable media storing code or computer instructions that may be used by a computing device (e.g., the controller 18) to monitor the sensors 12 and actuate the final elements 14. By monitoring the sensors 12 and responding accordingly through the final elements 14, the SIF 20 may be used to more safely operate the process.

Depending on the process and standards used (e.g., ISA 584.10, IEC 61508), the SIF 20 may be provided so as to enable a desired performance measure (e.g., SIL, PFD, RRF). Accordingly, a specific SIF 20 model may be constructed using techniques such as Markov models, FTA, RBD, risk graphs, and/or layer protection analysis (LOPA), and used to derive the SIF's 20 performance measures. However, the SIF 20 is generally designed to support a specific process, including specific machinery 21. For example, the SIF 20 may be designed to support fluid level protection, pressure, flow rates, flow mass, or a combination thereof, in an HRSG, or to support overspeed protection operations of a turbine system coupled to an HRSG and having an analog tachometer. In another similar overspeed protection process, a digital tachometer may be used. Generally, the SIF 20 may have to be re-analyzed to arrive at the new performance measures used in supporting the new, albeit similar, equipment. Because of the number, complexity, and interrelationship of equipment, such as the 9F turbine equipment fluidly coupled to an HRSG included in a power generation process, the SIF modeling effort may be quite considerable in terms of time and cost. Every new derivation of the 9F turbine or the HRSG, as well as every new installation, may be modeled anew. By providing for a model library 22 including component models 24, 26, 28, 30, 32 and 34, the techniques disclosed herein may substantially reduce the modeling effort In the depicted embodiment, the component models 24, 26, 28, 30, 32 and 34 may be created by a SIS modeling tool 36. For example, the SIS modeling tool 36 may receive inputs describing details of the equipment and systems used in the process, such as failure rates for sensors 12 and final elements 14, details of the specific configuration of the 9F turbine and supporting equipment, details of the power generation process, maintenance details (e.g., proof test intervals, maintenance schedules, personnel), desired level of performance (e.g., SIL level), and so forth. The inputs may also include a modeling methodology, such as FTA, RBD, risk graphs, LOPA, and/or Markov modeling. Markov models may be particularly apt for the creation of the component models 24, 26, 28, 30, 32 and 34, insofar as the Markov models may more easily model states, state interactions, and time dependency.

The SIS modeling tool 36 may be used to model all aspects of the desired process and equipment as components or subsystems. That is, instead of creating a single model focused on a specific process and equipment configuration, multiple component models 24, 26, 28, 30, 32 and 34 focused on various configurations for the process and equipment are provided. For example, for a given subsystem, such as a HRSG subsystem, rather than building a single model, a variety of HRSG models 24, 26, 28, 30, 32 and 34, may be created based on the various possible configurations of the HRSG and/or overspeed protection subsystems. In one Markov model example, various XooN models may be built, where N denotes the total number of components in the subsystem, and X denotes the number of components that have to be operational to enable the subsystem to work as designed. For example, in a Tool subsystem, if a single component is not operational, then the system is deemed not operational. In a 1oo2 subsystem, a first component or channel may fail, and a second component or channel may provide redundant operations so that the subsystem continues to operate. Likewise, in a 2oo3 subsystem, a first and a second component have to be in an operational condition for safe operations. In a 4oo4 subsystem, all 4 components have to be operational for the subsystem to operate as designed. Accordingly, the model library may include, for each subsystem or component of the observed process, XooN models, where N may be 1, 2, 3, 4, 5, 6, 7, 8, 9, 10, 100, or more. In this manner, a subsystem may be modeled multiple times, each model providing a different reliability configuration. One model may be a Tool model, another model may be a 1oo2 model, another model may be a 2oo3 model, and so forth. The resulting models, such as models 24, 26, 28, 30, 32, and 34, may then be stored by the model library 22. It is to be noted, that while the model library 22 shows six models, more or less models may be used. Indeed, for some processes, the model library 22 may store upwards of several thousand models.

The SIS modeling tool 36 may also be used to combine the models 24, 26, 28, 30, 32, and 34 in the model library. For example, the models 24, 26, 28, 30, 32, and 34 may be used as "building block" component models to design a more complex model, as described in more detail below. Advantageously, by providing for component models 24, 26, 28, 30, 32, and 34, which may be combined to build larger models, the SIF 20 may be more quickly and easily analyzed. Indeed, a SIF model focused on a specific reliability configuration and/or equipment may be constructed by using one or more of the pre-existing models 24, 26, 28, 30, 32, and 34 and the SIS modeling tool 36, thus minimizing or eliminating modeling, for example, HRSG systems, anew.

The models 24, 26, 28, 30, 32, and 34 may be used by a dynamic risk calculation engine (DRCE) 38 to derive performance measures, such as PFD. Advantageously, the DRCE 38 may incorporate input data from the sensors 12, final elements 14, the controller 18, and other systems 16, to update the performance measures. Indeed, the DRCE 38 may continuously update the performance measures based on process conditions (e.g., temperatures, pressures, speed, flow rates, mass flows, fluid levels, fuel usage, fired hours), unexpected events (trips, outages, load rejections, and/or expected events (e.g., scheduled maintenance, replacements, refurbishments). Accordingly, the DRCE 38 may enable a real-time or near real-time assessment of risk. This risk assessment may then be used to derive certain actions, including commanding the execution of partial or full proof tests, and providing maintenance schedules, such as proof tests and schedules for HRSG systems and components. The actions may result in a change of the risk, which may then be re-derived by the DRCE 38. Accordingly, the DRCE 38 may provide for a feedback loop suitable for deriving risks and responding with appropriate actions.

Additionally or alternatively, the risks derived by the DRCE 38 may be communicated, for example, to the other systems 16 and/or to other DRCEs 38. For example, maintenance, operational, and/or economic decisions or actions may be made, taking into account the risk derived by the DRCE 38. The decisions may be used to better optimize maintenance, optimize the procurement of parts, minimize insurance costs, optimize the allocation of equipment, the allocation of personnel, and/or improve the training of personnel (e.g., safety training). In a maintenance optimization example, maintenance activities may be synchronized, maintenance activities may be minimized, and/or equipment downtime may be minimized.

During maintenance synchronization, the risk derived by the DRCE 38 may be used to better synchronize maintenance activities across equipment. For example, replacement of an HRSG component (e.g., a feed-water control valve, a boiler stem pressure sensor, etc.) may be synchronized with other activities based on their current risk, such as turbine shroud inspection, a replacement of turbine cans, a replacement of turbine blades, and so on. Likewise, minimization of maintenance activities may be provided based on the DRCE 38 risk assessment. For example, a maintenance schedule may be derived that enables equipment to be used up to a maximum desired risk, thus enabling a minimal maintenance schedule that supports the desired risk. Similarly, equipment interruption may be minimized. For example, the continuous operation of a turbine system and HRSG subsystem may be maximized by deriving the risk of continuing operations with the aforementioned equipment as-is. Furthermore, the DRCE 38 may include an HRSG advisory system 39 that may be used to determine a most likely state of an HRSG in the machinery 21.

These risks derived by the DRCE 38 may also enable a multi-plant or multi-facility optimization. For example, processes and equipment in a first plant (e.g., power production plant) may be monitored by a first DRCE 38, while processes and equipment in a second plant may be monitored by a second DRCE 38 communicatively coupled to the first DRCE 38. By deriving risks across plants, decisions may be derived that optimize multi-plant (or multi-facility) operations, maintenance, uptime, and/or economics. For example, a first plant may include equipment that the DRCE 38 may have estimated to be near end-of-life, accordingly, a second plant may be optimized to provide for added power during the time that the first plant is refurbished.

Figure 2:
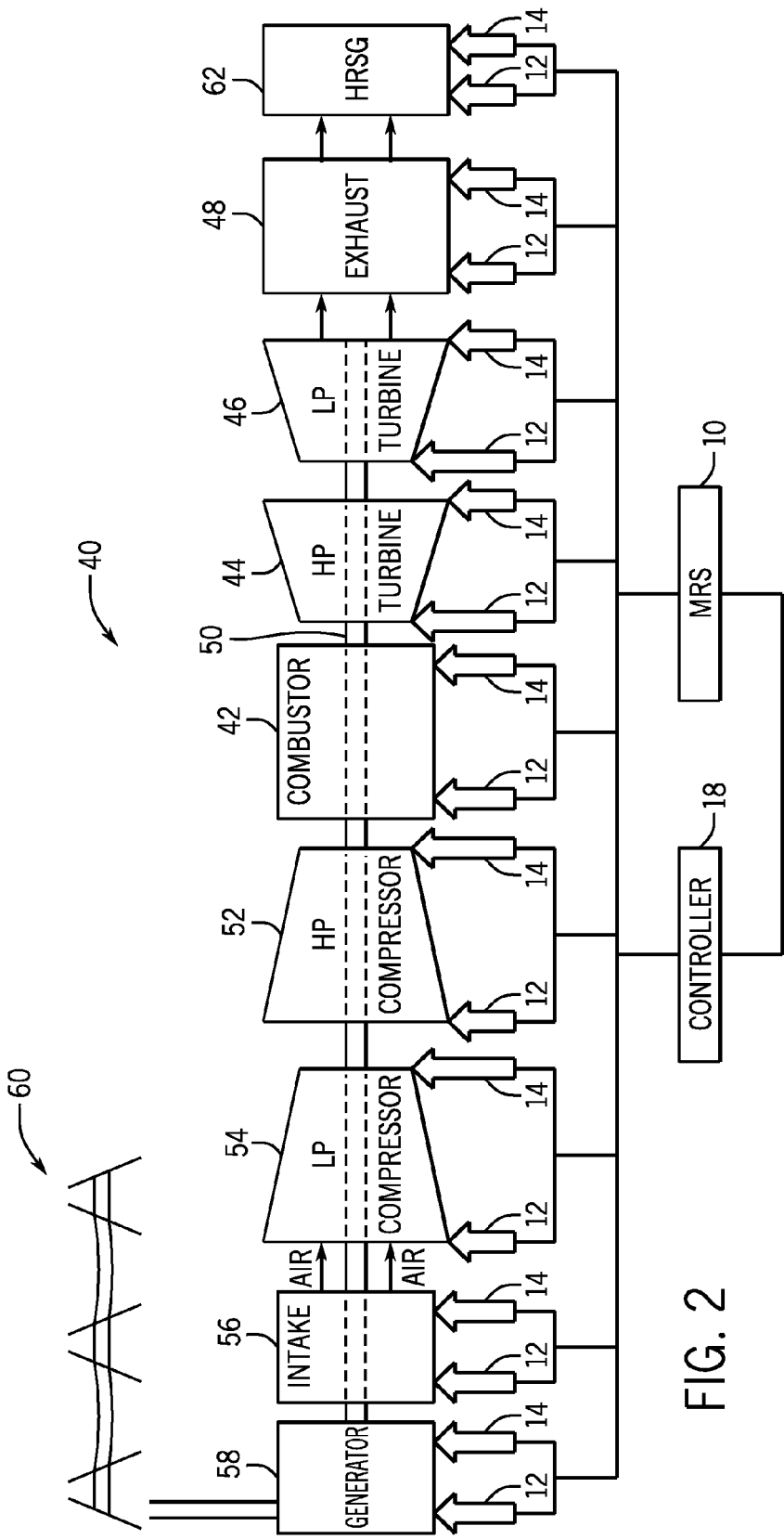
FIG. 2 is a schematic diagram of an embodiment of the MRS of FIG. 1 communicatively coupled to a turbomachinery system having a heat recovery steam generator (HRSG) and a dynamic risk calculation engine (DRCE)

It may be useful to describe an embodiment of the some example machinery 21 that may be analyzed and/or monitored by the systems and methods described herein, such as a turbine system 40 illustrated in FIG. 2. As depicted, the turbine system 40 may include a combustor 42. The combustor 42 may receive fuel that has been mixed with air for combustion in a chamber within combustor 42. This combustion creates hot pressurized exhaust gases. The combustor 42 directs the exhaust gases through a high pressure (HP) turbine 44 and a low pressure (LP) turbine 46 toward an exhaust outlet 48. The HP turbine 44 may be part of a HP rotor. Similarly, the LP turbine 46 may be part of a LP rotor. As the exhaust gases pass through the HP turbine 44 and the LP turbine 46, the gases force turbine blades to rotate a drive shaft 50 along an axis of the turbine system 40. As illustrated, drive shaft 50 is connected to various components of the turbine system 40, including a HP compressor 52 and a LP compressor 54.

The drive shaft 50 may include one or more shafts that may be, for example, concentrically aligned. The drive shaft 50 may include a shaft connecting the HP turbine 44 to the HP compressor 52 to form a HP rotor. The HP compressor 52 may include blades coupled to the drive shaft 50. Thus, rotation of turbine blades in the HP turbine 44 causes the shaft connecting the HP turbine 44 to the HP compressor 52 to rotate blades within the HP compressor 52. This compresses air in the HP compressor 52. Similarly, the drive shaft 50 includes a shaft connecting the LP turbine 46 to the LP compressor 54 to form a LP rotor. The LP compressor 54 includes blades coupled to the drive shaft 50. Thus, rotation of turbine blades in the LP turbine 46 causes the shaft connecting the LP turbine 46 to the LP compressor 54 to rotate blades within the LP compressor 54. The rotation of blades in the HP compressor 52 and the LP compressor 54 compresses air that is received via an air intake 56. The compressed air is fed to the combustor 42 and mixed with fuel to allow for higher efficiency combustion. Thus, the turbine system 40 may include a dual concentric shafting arrangement, wherein LP turbine 46 is drivingly connected to LP compressor 54 by a first shaft portion of the drive shaft 50, while the HP turbine 44 is similarly drivingly connected to the HP compressor 52 by a second shaft portion of the drive shaft 50 internal and concentric to the first shaft. Shaft 50 may also be connected to an electrical generator 58. The generator 58 may be connected to an electrical distribution grid 60 suitable for distributing the electricity produced by the generator 58.

The turbine system 40 may also include the plurality of sensors 12, configured to monitor a plurality of engine parameters related to the operation and performance of the turbine system 40, as described herein. The turbine system 40 may additionally include the plurality of actuators 14, configured to actuate various equipment of the turbine system 40. The sensors 12 may measure, for example, environmental conditions, such as ambient temperature and ambient pressure, as well as a plurality of engine parameters related to the operation and performance of the turbine system 40, such as, exhaust gas temperature, rotor speed, engine temperature, engine pressure, gas temperature, engine fuel flow, vibration, clearance between rotating and stationary components, compressor discharge pressure, exhaust emissions/pollutants, and turbine exhaust pressure. Further, the sensors 12 may also measure actuator 14 information such as valve position and a geometry position of variable geometry components (e.g., air inlet). Measurements taken by the sensors 12 may be transmitted to the MRS 10 and the controller 18. Likewise, data from the MRS 10 and the controller 18 may be transmitted to the final elements 14.

The turbine system 40 may also include a heat recovery steam generator (HRSG) 62. Once exhaust gas passes into the HRSG 62, the HRSG 62 uses heat remaining in the exhaust gas to produce additional power, thereby increasing efficiency of the turbine system 40. In some embodiments, the HRSG 62 may include additional functions, such as emissions controls (e.g., selective catalytic reduction [SCR] systems). In certain embodiments, the HRSG 62 includes an economizer, evaporator, superheater, and/or preheater. The economizer heats liquids (e.g., water) using heat in the exhaust gas received from the exhaust duct 36. The evaporator turns the liquid to its gaseous form (e.g., steam). The superheater converts saturated steam into dry steam (i.e. steam with a temperature beyond the saturation point for the liquid). The superheater may include a radiant superheater, convection superheater, a separately fired superheater, or some combination thereof. Furthermore, in certain embodiments, the HRSG 62 may be a single pressure HRSG that contains a single steam drum (e.g., boiler) that is generated at a single pressure level. In other embodiments, the HRSG 62 may a multi-pressure HRSG that consists of two or more sections. For example, the HRSG 62 may include a low pressure (LP) section, an intermediate pressure (IP) section, and/or a high pressure (HP) section. In such embodiments, each section may include a steam drum and evaporate section. Moreover, the HRSG 62 and/or the exhaust system 22 may include an attemperation system that controls the maximum temperature of the superheated steam. For example, the attemperation system may lower the temperature of the superheated steam by injecting liquid (e.g., water) into the steam.

Figure 3:
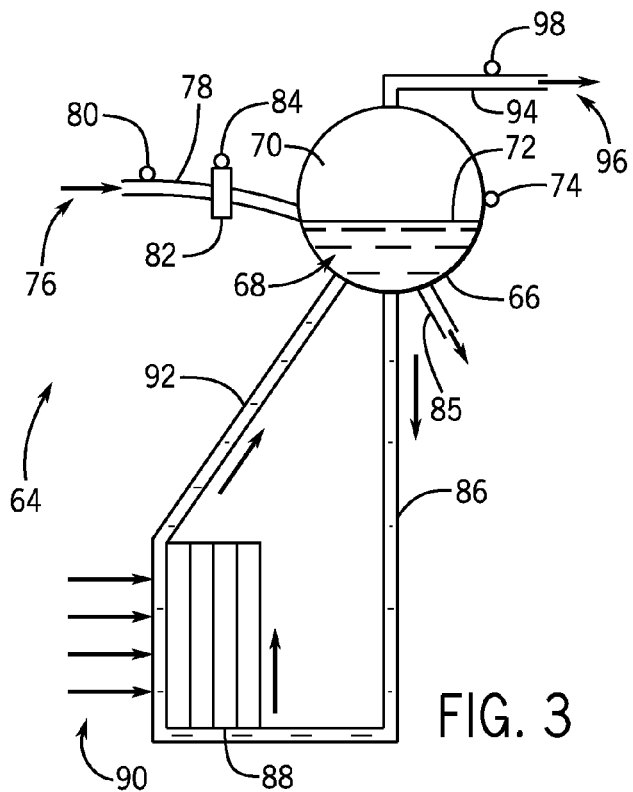
FIG. 3 is a diagram of an embodiment of a boiler system of the HRSG of FIG. 2.

The transmitted measurements may also be processed as part of the SIF 20 inputs to derive an action, such as pressure protection (e.g., boiler pressure protection, fluid flow protection, mass flow protection, and/or water level protection, as described in more detail with respect to FIG. 3. FIG. 3 illustrates an embodiment of a boiler system 64 that maybe used in the HRSG 62 of the turbine system 40. The HRSG 62 includes a water tank (e.g., boiler) 66 storing a fluid 68 that may be evaporated into steam 70. In certain embodiments, walls of the water tank 66 may expand/contract based on load changes of the turbine system 40 (e.g., heat produced by the turbine system 40), ambient temperature, steam pressure, and/or other suitable issues. Within the water tank 66, the fluid 68 may be stored to produce the steam 70. A fluid level 72 may be maintained to a desired level using a water level sensor 74. When the water level 72 is not a desired level, steam 70 may be produced at a rate other than the desired level 72. To maintain the water level 72, a feed-water flow 76 may be passed into the water tank 66 through a feed-water channel 78, the rate of flow of the feed-water flow 76 may be monitored using the feed-water flow sensor 80 and/or controlled using the feed-water valve 82. In some embodiments, the feed-water valve 82 may include a feed-water sensor 84 that determines whether the feed-water valve 82 is not working as desired. In certain embodiments, the water tank 66 may have a boiler blowdown 85 that enables the removal of sediment and/or solids that have been dissolved in the fluid to reduce/eliminate the likelihood of deposits forming in the boiler system that may interfere with the evaporation process. In some embodiments, the boiler blowdown 85 a surface blowdown, a bottom blowdown, and/or other suitable sediment/solid removal methods.

To create the steam 70, the fluid 68 passes through a downcomer conduit or tube 86 toward an evaporator 88. The evaporator 88 receives a heat input 90 from the turbine system 40 via the exhaust 48 and uses the heat input 88 to evaporate the fluid 68 into steam 70. The steam 70 then passes through a riser tube 92 to the water tank 66. The steam 70 in the water tank 66 passes through a steam outlet 94 to a steam turbine to generate energy in addition to that produced by the turbines 44 and 46. For example, in some embodiments, the steam turbine may be coupled to a generator to produce additional electrical energy. Steam flow 96 through the steam outlet 94 may be monitored via a steam-flow sensor 98. The HRSG system 62 may be modeled, including using one or more Markov models, described in FIGS. 5-7 below, to predict, for example, undesired behavior in the HRSG 62, such as undesired water levels, pressures, flow speeds, mass flows, and so on. In one embodiment, the probability of occurrence of the undesired event may be derived, and used, for example, by the control system 18 to provide for amelioration actions and/or continued operations with backup systems.

Figure 4:
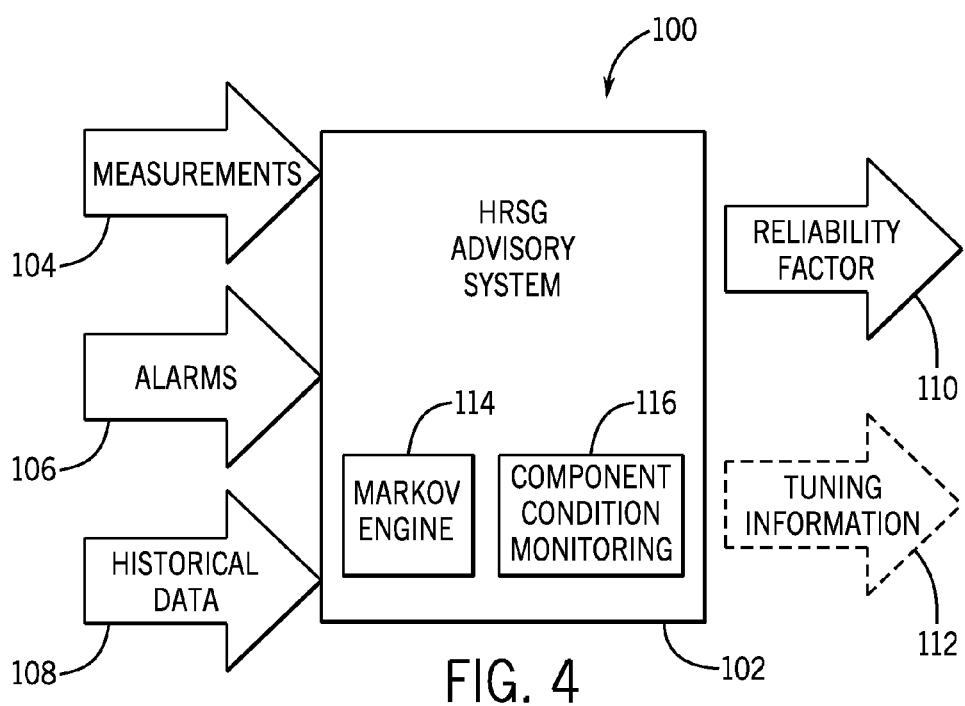
FIG. 4 is a block diagram of an embodiment of an HRSG advisory system that may be used by the DRCE of FIG. 2.

FIG. 4 illustrates a flow-diagram of an embodiment of a process 100 that may be used to provide advisory information regarding the HRSG 62. An advisory system 102 that receives a variety of inputs relating to the turbine system 40 and/or the HRSG 62. For example, in some embodiments, the advisory system 102 may receive measurements 104, alarms 106, and/or historical data 108 related to the turbine system 40. The measurements 104 may include measurements from sensors (e.g., feed-water sensor 84), actuators (e.g., feed-water valve 82), commands, feedbacks, feed forwards, and/or other suitable parameters used in the operation of the turbine system 40. The alarms 106 may include alarms from other portions of the turbine system 40 that may be relevant to the HRSG 62. The historical data 108 may include information about a controller used in the turbine system 40 and/or the HRSG 62. For example, if the controller used to control the HRSG 62 is too aggressively tuned, the controller may cause an overshoot in the HRSG 62.

The HRSG advisory system 102, upon receiving relevant inputs, may provide a reliability factor 110. The reliability factor 110 may include a probability of failure in the HRSG 62. In some embodiments, the HRSG advisory system 102 may also send tuning information 112. In such embodiments, the tuning information 112 may include a controller performance rating and/or controller re-tuning recommendations suitable for tuning the controller 18. For example, in some embodiments, the HRSG advisory system 102 may send degraded health information for the system as tuning information 112 to instruct the turbine system 40 how to re-tune its controller 18 to adjust for the degraded health information. Accordingly, the HRSG 62 and turbine system 40 may operate more efficiently, even with equipment in undesired conditions.

In some embodiments, the HRSG advisory system 102 may include a Markov engine 114, as discussed in more detail below. In some embodiments, the Markov engine 114 may receive inputs from controller performance monitoring algorithms (e.g., CLPM algorithms), such as auto correlation function (ACF), relative damping index (RDI), stiction index (SI), non-Gaussanity index (NGI), non-linearity index (NLI), and/or other suitable controller performance monitoring algorithms. For example, ACF may be used to normalize transformation of the controller function by cross-correlating the controller function with itself. The ACF may be used to rate a controller type as aggressive or passive using an ACF formula, such as Equation 1 below:

$$R(k) = \frac{1}{\sigma_e^2} \sum_{n=1}^{N-k} [e(n) - \mu_e][e(n+k) - \mu_e] \quad \text{(Equation 1)}$$

Where R(k) is an autocorrelation function coefficient of a discrete time series for a tracking error e at sampling time k, $\mu_e$ is the average of the time series (e), N is the total number of time series samples, and $\sigma_e^2$ is a variance of the time series (e)

An RDI may be calculated to determine a relative damping index of a second order process (e.g., process that generates the autocorrelation function) using an RDI formula, such as Equation 2 below:

$$RDI = \frac{\xi - \xi_{agg}}{\xi_{slw} - \xi}, \xi_{agg} > \xi_{slw} \quad \text{(Equation 2)}$$

Where:

$$\xi : \tau^2 \frac{d^2 r(t)}{d^2 t} + 2\tau\xi \frac{dr(t)}{dt} + r(t) = K \frac{du}{dt}(t) \quad \text{(Equation 3)}$$

$\xi$ is the damping factor of a second order process. For example, for a stable process $\xi$>0. $\xi_{agg}$ is a lower limit on the damping factor to model aggressive control action. For example, if $\xi_{agg}$>$\xi$, then |RDI|<1 and RDI<0, the process control action would be rated as too aggressive. $\xi_{slw}$ is an upper limit on the damping factor to model sluggish/slow control action. For example, if 0<$\xi$<$\xi_{slw}$, then |RDI|>1 and RDI<0, and the process control action is rated as too slow. Moreover, K is the gain of the second order process, τ is the natural period of oscillation of the second order process, and u is the input/driving force to the second order process.

A stiction index may be calculated in accordance with an SI equation, such as Equation 4 below:

$$SI = \frac{MSE_{sin}}{MSE_{sin} + MSE_{tri}} \quad \text{(Equation 4)}$$

Where $MSE_{sin}$ is a mean squared error of a sinusoidal fitting to the tracking error signal e. A good fit to a sinusoidal wave means that there is little to no stiction, but the control is aggressively tuned. $MSE_{tri}$ is a mean squared error of a triangular fitting to the tracking error signal e. For a PI control, a good fit to a triangular wave means that there is valve stiction.

Additionally, in certain embodiments, the HRSG advisory system 102 may include a component condition monitoring component 116 that monitors the condition of components that may be used to determine health information that may be used to re-tune the controller.

Figure 5:
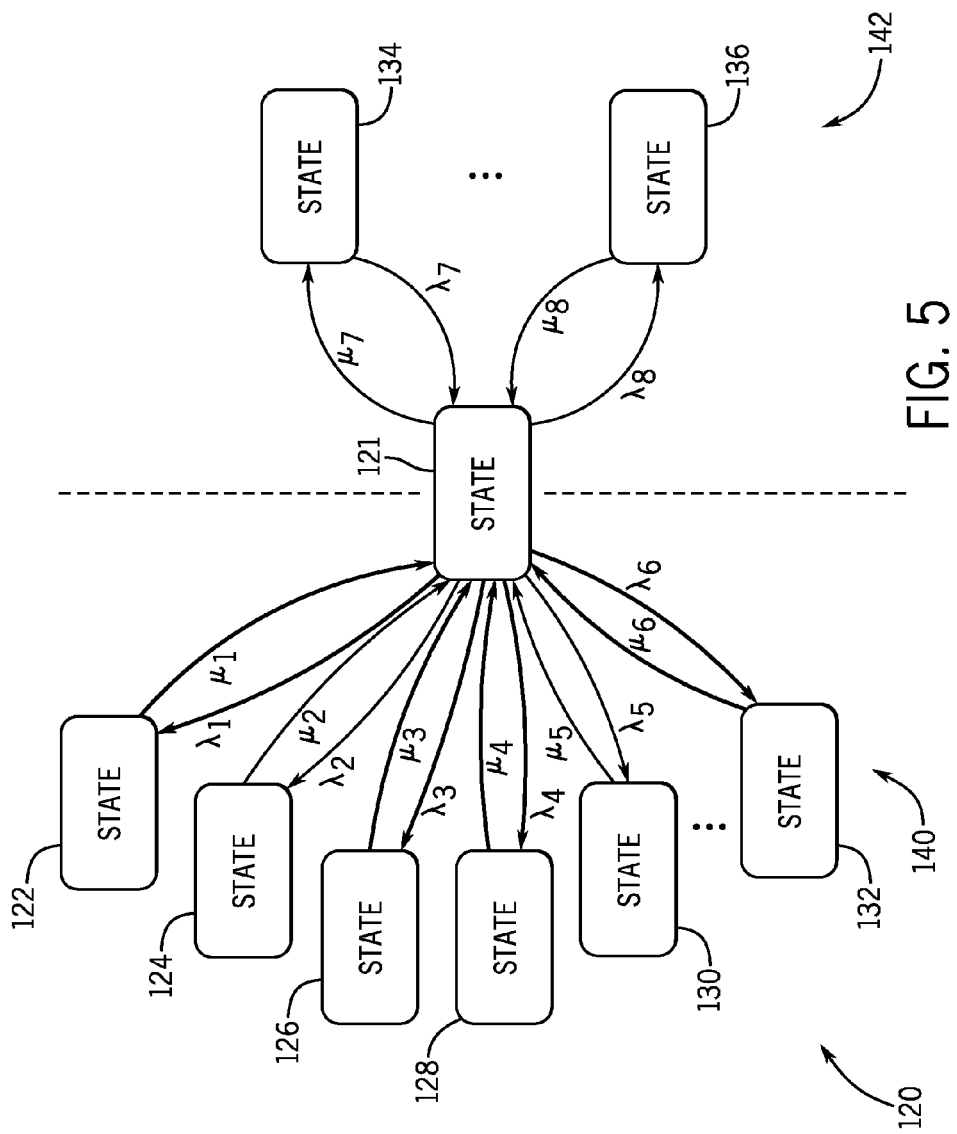
FIG. 5 is a block diagram of an embodiment of a Markov model suitable for modeling a boiler system.

FIG. 5 is a flow diagram view of an embodiment of a Markov model 120 that may be used by the HRSG advisory system 102, for example, to derive the reliability factor 110 and/or the tuning information 112. The illustrated Markov model 120 includes 9 states collectively referred to as states 121-136, and may be executed, for example, by the Markov engine 114. Each state of the states 121-136 may correspond to various states that correspond to various failure states in the HRSG 62.

The states 124-136 relationships are shown using λ and μ links. Each λ link represents a probability of transitioning from one state to another. For example, if state 121 denotes a healthy state of the HRSG and state 122 denotes a failure of the feed-water sensor 80, $\lambda_1$ may represent the probability of the feed-water sensor 80 failing. Each μ represents a probability of returning to the health state 121. For example, in the foregoing example, if the feed-water sensor 80 has failed placing the HRSG in state 122, $\mu_1$ represents the probability of recovering from the failure state 122 and returning to the healthy state 121.

The states 121-136 may be classified into one or more failure types. For example, in the illustrated embodiment, state 121 may illustrate a healthy state, and states 122-132 may include system failure states 140 that indicate that the system is down and states 134 and 136 may include derated health states 142 that indicate that the system is operating in a degraded mode. Although the illustrated Markov engine 120 includes six system failure states 140, other embodiments may include 1, 2, 3, 4, 5, or more system failure states 140. Similarly, some embodiments of the Markov engine 120 may include 1, 2, 3, 4, 5, or more derated health states 142. The failure states correspond to failures that result in the turbine system 40 and/or the HRSG 62. For example, the state 122 may correspond to a failure of the feed-water sensor 80. The state 124 may correspond to a failure of the steam flow sensor 98. The state 126 may correspond to a failure of a steam pressure sensor. The state 128 may correspond to a failure of the water level sensor 74. The state 130 may correspond to a failure of the feed-water valve 84. The state 132 may correspond to a control logic failure resulting from steam pressure transients. For example, if the water level fluctuates quickly and the control logic (e.g., proportional-integral-derivative controller) undesirably handles the changes, a failure may result. State 134 may correspond to a derated state that results from the controller behaving sluggishly causing valve oscillation and possibly reducing the life of the valve. State 136 may correspond to a controller behaving aggressively that results in actuator saturation by asking for too much flow.

Figure 6:
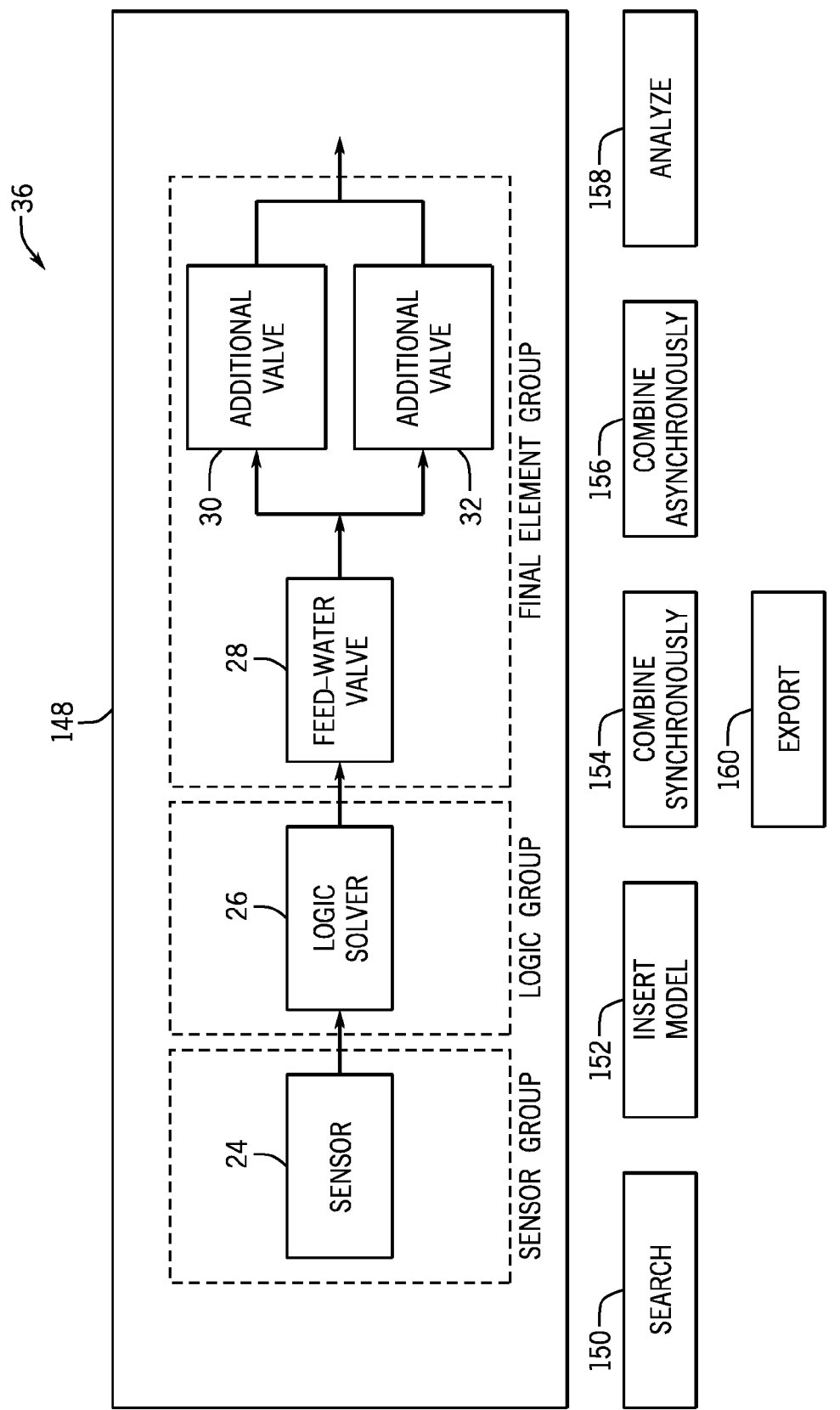
FIG. 6 is screenshot of an embodiment of a screen of a safety instrumented system (SIS) modeling tool

Turning now to FIG. 6, the figure depicts an embodiment of a display screen 148 (e.g., graphical user interface) of the SIS modeling tool 36 displaying an embodiment of the model 34. As mentioned above, the SIF 20 may be analyzed by using the model 34. The model 34 may have been constructed by using the SIS modeling tool 36 to combine pre-existing models 24, 26, 28, 30, and 32 for use in the HRSG advisory system 102. Indeed, the SIS modeling tool 36 may provide for modeling services that facilitate the creation and use of all models in the model library 22, such as the depicted models 24, 26, 28, 30, 32, and 34. In some embodiments, one or more of the models may model the HRSG 62. By more easily building reliability models out of component models, rather than by modeling each SIF anew, such as HRSG-focused SIFs, the systems and methods described herein may provide for a more efficient modeling that may also result in the minimization or elimination of modeling errors.

In the depicted embodiment, a user, such as a safety analyst or safety engineer, may use a search facility 150 (e.g., software search tool) to locate pre-existing model or models, such as the models 24, 26, 28, 30, and 32. The search facility may use a database (e.g., relational database, network database, file system) to list models by model type (e.g., Markov, FTA, RBD, risk graphs, and/or LOPA), by equipment (e.g., overspeed equipment, turbine equipment, safety-related equipment), by reliability architecture (e.g., XooN), and so on. The "found" models may then be inserted into the display for the screen 148, for example, by using an insert facility 152 (e.g., software insert tool).

The inserted models 24, 26, 28, 30 and 32 may then be combined into a larger model 34, for example, by using the combine facilities 154 and 156 (e.g., software tools). In the depicted embodiment, the component models 24, 26, and 28 may be combined synchronously (i.e., in series), and the models 30 and 32 may be combined asynchronously (i.e., in parallel). For example, the model 24 relating to the speed sensors 12 may be combined synchronously with the model 26 relating to the logic solver (e.g., controller 18) and the model 28 related to the feed-water valve (e.g., valve 82) by using the synchronous combination facility 154. Likewise, the model 30 may be combined asynchronously with the model 32 by using the asynchronous combination facility 156 (e.g., analysis software tool).

Additionally, the tool 36 may be used to select one or more of the models 24, 26, 28, 30, and 32 as first, second, and third element group of the SIF 20. For example, the model 24 may be selected as the first group (e.g., sensor group), the model 26 may be selected as the second group (e.g., logic solver group), and the models 28, 30, and 32 may be selected as the third group (e.g., actuator group), of the SIF 20. The combination of the models 24, 26, 28, 30, and 32 may then result in the combined model 34.

The user may then analyze the model 34 created by combining the component models 24, 26, 28, 30, and 32 by using, for example, an analyze facility 158. The analyze facility 158 may derive overall performance measurements for the newly created model 34 by using the pre-existing models 24, 26, 28, 30, and 32. Some example performance measures that may be automatically derived include but are not limited to reliability, PFD, and RRF.

Reliability $R_{SIF}(t)$ for the SIF 20 (e.g., model 34) related to the HRSG 62 may be calculated by using the equation:

$$R_{SIF}(t) = R_{sensor} * R_{solver} * R_{FeedWaterValve} * R_{AdditionalValve}$$

Where $R_{sensor}$ is the probability of the failure of a sensor (e.g., sensors 12), $R_{solver}$ is the probability of failure of the logic solver, $R_{FeedwaterValve}$ is the probability of failure of the feed water valve 82, and $R_{AdditionalValve}$ is the probability of failure of one or more additional valves (e.g., such as a valve for the steam outlet 94). The probability of failure on demand for the SIF 20 $PFD_{SIF}(t)$ may be calculated by using the equation:

$$PFD_{SIF}(t) = 1 - R_{SIF}(t)$$

The risk reduction factor RRF for the SIF 20 may be calculated by using the equation:

$$RRF = \frac{1}{PFD_{AvgSIF}}$$

The average probability of failure on demand $PFD_{AvgSIF}$ may be calculate as follows:

$$PFD_{AvgSIF} = \frac{1}{T} \int_0^T PFD_{SIF}(\tau) d\tau$$

Accordingly, the $PFD_{AvgSIF}$ provides for an overall PFD for the entire SIF 20, including all individual subsystems of the SIF 20. By providing for techniques useful in searching, combining, and analyzing the component models 24, 26, 28, 30, 32, and 34 included in the model library 22, the systems and methods described herein may enable the reuse of the component models 24, 26, 28, 30, and 32. By reusing, documented, substantially error-free component models from the library 22, any number of SIF designs may be analyzed and constructed in a more efficient manner. An export facility 160 may then be used to export the model 34 for use by, for example, the DRCE 38.

Figure 7:
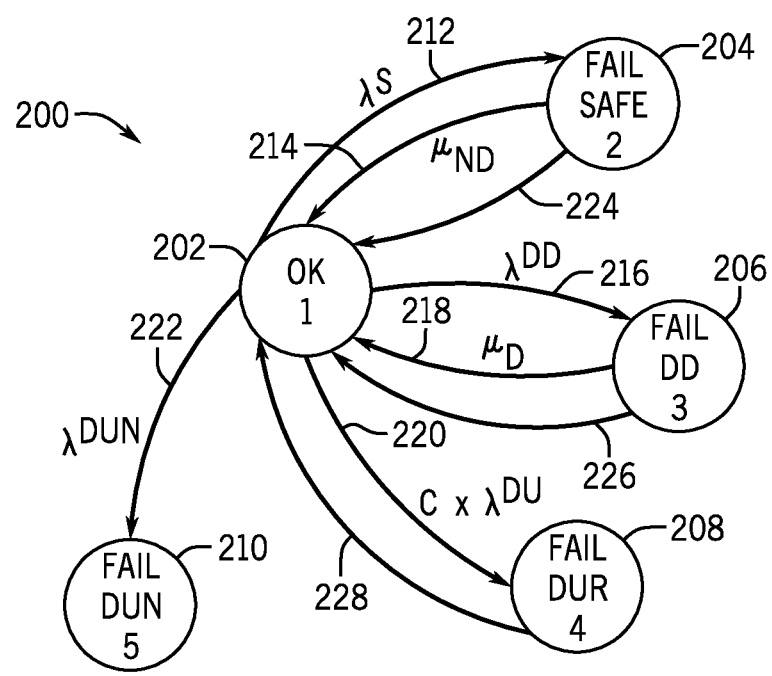
FIG. 7 is a block diagram of an embodiment of a Markov model suitable for modeling the HRSG.

It may be beneficial to describe certain model types, such as a Markov model embodiment depicted in FIG. 7. More specifically, FIG. 7 depicts a Markov model 200 suitable for use in reliability analysis of the HRSG 62, for example, included in the component models 28 and/or 30 having a Tool architecture. The model 200 may also be applicable to other XooN architectures (e.g., Markov model 140). As mentioned previously, Markov models may be particularly apt for reliability models because state and state transitions may be more easily defined and visualized. Additionally, the Markov models described herein account for time dependency, thus enabling a time-based derivation of performance measures such as PFD. Further, the Markov model may be used to incorporate certain actions, such as proof tests, suitable for transitioning between states.

In the depicted embodiment, the Markov model 200 includes a list of possible states 202, 204, 206, 208, and 210 for the system, possible transition paths 212, 214, 216, 218, 220, 222, 224, 226, and 228 between the states 202, 204, 206, 208, and 210, and rate parameters for the transitions $\lambda^S$, $\mu_{SSD}$, $\lambda^{DD}$, $\mu_O$, $C \times \lambda^{DU}$, $\lambda^{DUN}$. The state 202 (e.g., Ok state) denotes a system (e.g., HRSG 62) in a known healthy state. The state 204 (e.g., Fail Safe, derated states 142) denotes a state in which the system has failed in a safe manner. The state 206 (e.g., Fail DD, system fail states 140) denotes a state in which the system has failed but the failure is detected. The state 208 (e.g., Fail DUR) denotes a state in which the system has failed in an undetected condition, but is repairable, while the state 210 (e.g., Fail DUN) denotes a state in which the system has failed undetected and is not repairable.

The system may move from state to state via the state transitions 212, 214, 216, 218, 220, 222, 224, 226, and 228. If the system is in one state at a point in time, the probability of the system remaining in the same state will decrease based on rates of transition $\lambda^S$, $\mu_{SSD}$, $\lambda^{DD}$, $\mu_O$, $C \times \lambda^{DU}$, $\lambda^{DUN}$ depicted for their respective state transition. At some time, the system may transition from one state into another state. The lambda (i.e., $\lambda$) transitions are generally based on failure rates, while the mu (i.e., $\mu$) transitions are generally based on repair rates. In one embodiment, the lambda and mu rates are based on empirical data, such as a fleet-wide data (e.g., HRSG fleet data) detailing failure and repair rates. Additionally or alternatively, the lambda and mu rates may be based on theoretical analysis, such as low cycle fatigue (LCF) life prediction models, computational fluid dynamics (CFD) models, finite element analysis (FEA) models, solid models (e.g., parametric and non-parametric modeling), and/or 3-dimension to 2-dimension FEA mapping models that may be used to predict the risk of equipment malfunction and/or the rate of repairs.

The rate of transitioning from the state 202 to the state 204 is depicted as $\lambda^S$ (e.g., safe failure rate), while the rate of transitioning from the state 202 to the state 206 is depicted as $\lambda^{DD}$ (e.g., dangerous detected failure rate). Likewise, the rate of transitioning from the state 202 to the state 208 is depicted as $C \times \lambda^{DU}$ (e.g., undetected failure rate with coverage), while the rate of transitioning from the state 202 to the state 210 is depicted as $\lambda^{DUN}$ (e.g., undetected failure rate without repair).

In the depicted embodiment, a probability distribution vector $S_k$ of the states 202, 204, 206, 208, and 210 may be derived by the equation:

$$S_k = [p_{1k} p_{2k} p_{3k} p_{4k} p_{5k}]$$

where $p_n$ denotes the probability of the system being at state n. The states' probability propagation in between events may then be found by the equation:

$$S_{k+1} = S_k \times e^{A \Delta t}$$

where A is related to the appropriate failure and repair rates lambda and mu respectively. Additionally, the Markov model 200 may be used to derive n-time steps. That is, the reliability of the modeled system may be simulated, such that n future steps may be predicted, each step having associated reliability and reliability and performance measures (e.g., $R_{SIF}(n)$, $PFD_{SIF}(n)$, $PFD_{AvgSIF}(n)$). In one embodiment, a derivation of the Chapman-Kolmogorov equation may be used to calculate the n-time reliability and performance measures. For example, the probability of going from a state i to a state j in n-time steps may be calculated by using the equation:

$$p_{ij}^{(n)} = Pr(X_{k+n} = j | X_k = i)$$

where the marginal distribution $Pr(X_n = x)$ is the distribution over the states 202, 204, 206, 208, and 210 at time n. By using the calculated probabilities, the Markov model 200 may be used to predict one or more performance measures (e.g., $R_{SIF}(n)$, $PFD_{SIF}(n)$, $PFD_{AvgSIF}(n)$). The predictions may then be used to derive certain actions, such as maintenance actions (e.g., online diagnosis, output diagnosis, proof test scheduling, full refurbishment), economic actions, and/or plant operation actions. For example, a proof test (e.g., partial proof test, full proof test) may be commanded based on the predictions. The results of the proof test, alarms, or other events (e.g., maintenance actions) may then be used to update the model 200. For example, a successful proof test may result in the model returning to the Ok state 202 via state transitions 224, 226, or 228. Indeed, the Markov model 200 may be used to enable the execution of a proof test, and the results of the proof test may then be used to update the model 200. By providing for decisions (e.g., proof tests, alarms, events) useful in evaluating the SIF 20, the reliability of the SIF 20 may be substantially improved. Additionally or alternatively, the model 200 may be used for online diagnosis, such that failures of the SIF 20 may be detected and corrected, output diagnosis, such that subsystems of the turbine system 40 may be driven to a safe condition if a failure is detected, proof test scheduling as described below with respect to FIG. 8, and/or full refurbishment, such that the SIF 20 (and/or turbine 40 subsystems) may be brought back to a "as new" condition.

Figure 8:
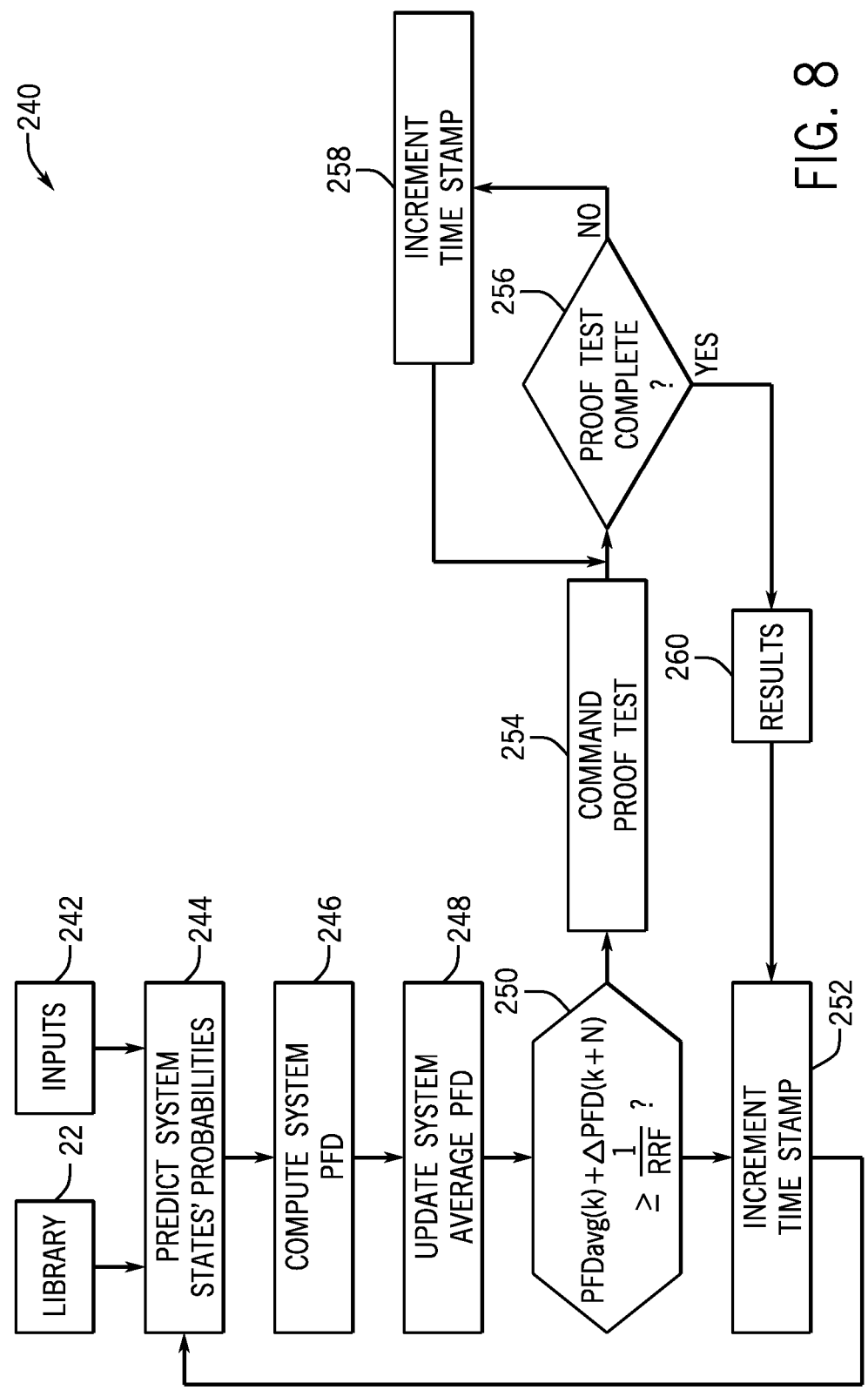
FIG. 8 is a flowchart of an embodiment of a process useful in deriving a more efficient proof test interval.

Turning to FIG. 8, the figure depicts a process 240 that may be used to compute performance measures and/or reliability measures based on the techniques described herein, and to derive certain actions (e.g., proof test actions) based on the computations. The process 240 may be implemented as code or computer instructions stored in non-transitory machine readable media and executed, for example, by the controller 18.

In the depicted embodiment, the DRCE 38 may use the models 24, 26, 28, 30, 32, and/or 34 included in the model library 22, in addition to other inputs 242 (e.g., sensor values), to predict a system's states' probabilities (block 244), such as the probabilities included in the probability distribution vector $S_k$ described above. The inputs 242 may include fault tolerance inputs (e.g., RRF), maintenance policy inputs (e.g., online diagnosis input, output diagnosis input, proof test model input, full refurbishment input), and sensor 12 inputs and other systems 16 inputs. In one example, $S_k$ and related probabilities may be found by using Markov modeling techniques and/or other modeling techniques (e.g., FTA, RBD, risk graphs, LOPA) suitable for modeling, for example the turbine system 40 including the HRSG 62. In one embodiment, the process 240 may then compute the system PFD (block 246) by using the equation:

$$PFD_{SIF}(t) = 1 - R_{SIF}(t).$$

The process 240 may then update the system average PFD $PFD_{AvgSIF}$ (block 248) based on the derived PFD (block 246). For example, the equation:

$$PFD_{AvgSIF} = \frac{1}{T}\int_0^T PFD_{SIF}(\tau)d\tau \text{ may be used.}$$

By deriving $PFD_{AvgSIF}$, the process 240 enables the derivation of the overall PFD for the system under analysis (e.g., SIF 20). Indeed, the overall PFD for a system, such as the SIF 20, may be automatically derived, for example, by the DRCE 38 which may be included in the controller 18. Other performance measures may be similarly derived, included but not limited to MTTF, MTBF, SFF, and/or HFT.

The process 240 may then determine (decision 250) if the $PFD_{AvgSIF}$ summed to a N-step change (e.g., $\Delta PFD(k+N)$) is greater than 1/RRF, where RRF may be input by the user or system operator. By providing for the RRF input, the process 240 may enable the use of a variety of reliabilities, as desired by the user or system operator. That is, the decision 240 may be used to determine if the system is performing within a desired reliability range (e.g., within a desired RRF). If the system is performing as desired (decision 250), then the system may increment a time stamp (block 252) and loop back to the block 244 for further processing as described above. If the system is performing outside of a desire reliability range, then the process 240 may command the execution of an action (block 254), such as a proof test action. For example, the system may command that a valve (e.g., feed-water valve 84) be opened. The proof test may be automatically executed, or may be executed by human intervention after prompting.

The process 240 may then wait on the result of the action (decision 256), such as the completion of the proof test. If the proof test is not complete, then the process 160 may increment a time stamp (block 258) and iterate back to the decision 256. Once the proof test is complete, the results of the proof test (block 260) may be used as additional inputs to the process 240. For example, input data (block 260), such as field device data, may be used to determine the performance of equipment used in the proof test. The process may then increment a time stamp (block 258) and iterate back to block 244 for further processing. Advantageously, the process 240 may derive a proof test interval schedule that more efficiently enables equipment maintenance and utilization based on a desired RRF. In one example, a maintenance schedule (e.g., proof test schedule) may be derived that minimizes equipment replacement based on a desired RRF. Additional or alternative to maintenance actions, operational and/or economic actions may also be derived based on the calculated performance measures.

Figure 9:
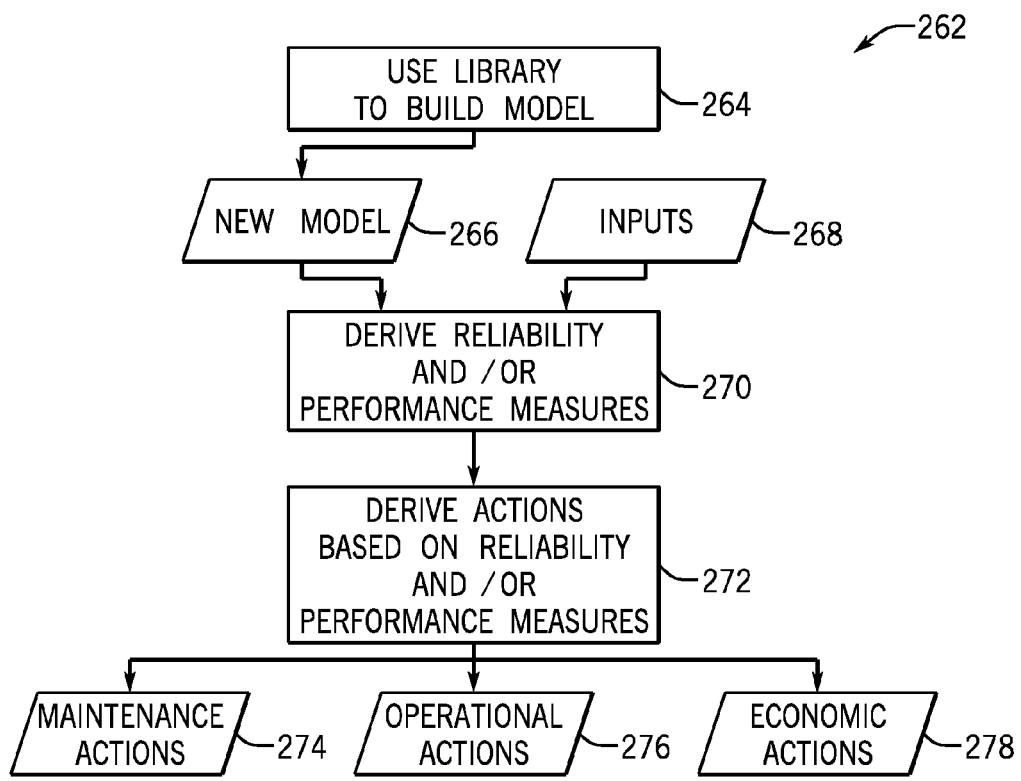
FIG. 9 is a flowchart of an embodiment of a process useful in deriving maintenance actions, operational actions, and/or economic actions, based on calculated risk.

FIG. 9 depicts an embodiment of a process 262 that may use the systems and methods described herein to derive certain maintenance actions, operational actions, and/or economic actions, based on calculated performance measures (e.g., PFD, MTTF, MTBF, SFF, HFT) that may have been derived by using the model library 22. The process 262 may be implemented as code or computer instructions stored in non-transitory machine readable media executed, for example, by the controller 18. In the depicted embodiment, the process 262 may use the model library 22 to build a model (block 264), such as the model 34 suitable for analyzing the performance measures and reliability of a system of interest, such as the SIF 20. By reusing the component models in the model library 22 rather than building a model anew, substantial time savings may be achieved. Indeed, by reusing previously constructed models significant time savings may be enabled. Further, because the models of the model library 22 may have been error check more extensively and used multiple times, modeling errors may be minimized or eliminated.

The new model 266 may then be used, for example, with inputs 268, to derive reliability and/or performance measures (block 270). The inputs 188 may include fault tolerance inputs (e.g., RRF), maintenance policy inputs (e.g., online diagnosis input, output diagnosis input, proof test model input, full refurbishment input), and sensor 12 inputs and other systems 16 inputs. Techniques, including but not limited to Markov modeling, RBD, risk graphs, LOPA, or a combination thereof, may then be used to derive the reliability and/or performance measures (e.g., PFD, MTTF, MTBF, SFF, HFT). In the depicted embodiments, the derived reliability and/or performance measures (block 270) may then be used as inputs to optimization systems, including maintenance optimization systems, operational optimization systems, and/or economic optimization systems. These aforementioned systems may then derive certain actions (block 272) based on the reliability and/or performance measures. For example, maintenance actions 274, operational actions 276, and/or economic actions 278 may be derived (block 272).

Maintenance actions 274 may include the following: 1) The derivation of a more efficient proof test schedule that may minimize a time interval between proof tests but also maintain a desired reliability measure (e.g., RRF). 2) The derivation of a synchronized maintenance schedule suitable for synchronizing, for example, the maintenance of the SIF 20 with the maintenance of other subsystems of the system 40. By synchronizing maintenance of various systems with the SIF 20, the utilization of resources may be improved while reducing time and cost. 3) The derivation of a bill of materials (BOM) list of parts ordered by likelihood of replacement. For example, components of the HRSG 62 having a higher probability of replacement may be listed in the BOM, in order of probability of replacement, replacement cost, time to procure, supplier availability, criticality (e.g., fault tree criticality), and so on. 4) The incorporation of the reliability and/or performance measures for use as input data by another system, such as an asset management system (e.g., IBM Maximo available from IBM Co., of Armonk, N.Y.). The asset management system may then use the input data to track and manage HRSG 62 assets across the enterprise. For example, equipment condition assessment reports and correlative maintenance directives may be issued by the asset management system. 5) The derivation of maintenance actions across multiple sites. For example, power grid 60 maintenance decisions may be more optimally derived by using reliability and/or performance measure across various sites.

Operational actions 276 may include using the reliability and/or performance measures to drive certain equipment. Indeed, by providing for real-time (or near real-time) reliability and/or performance measures, the plant operator may make operational decisions. For example, the plant operator may weigh the benefits of continuing operations when the HRSG 62 is in a derated state, such as when the valve 84 oscillates due to the controller 18 behaving sluggishly (e.g., state 134), actuator saturation resulting from a controller 18 behaving aggressively (e.g., state 136), or any other derated states for the HRSG 62.

Economic actions 278 may also be derived. For example, current reliability and/or performance measures may aid in actuarial derivations of plant risk. Indeed, by providing for updated risk assessments, insurance costs may be more accurately derived, including derivations that apply to specific locations and plant operators, rather than generic costs that apply to all equipment of the same type. For example, the trade off costs for operating an HRSG 62 with valve oscillation (e.g., state 134) may make it worth more to operate the HRSG 62 in such a state when the power recovered cost is sufficiently greater than the potential reduction of life for the valve, because valve replacement costs are exceeded by expected gain from power production during operation of the HRSG 62 in the derated state versus shutting down the HRSG 62 for maintenance.

Technical effects of the invention include providing for a model library including a plurality of component models suitable for modeling a variety of safety systems including those in a HRSG. The models may be combined into a larger model suitable for analyzing a variety of safety instrumented functions (SIFs). The models may use certain inputs (e.g., online diagnosis input, output diagnosis input, proof test input, full refurbishment input), to derive certain actions including maintenance actions. Operational and/or economic actions may also be derived. The models may include techniques such as Markov modeling, Fault Tree Analysis (FTA), reliability block diagrams (RBDs), risk graphs, and/or layer of protection analysis (LOPA) to analyze the SIFs and to derive the reliability and/or performance measures, such as a probability of failure on demand (PFD), mean time to failure (MTTF), mean time between failure (MTBF), safe failure fraction (SFF), hardware failure tolerance (HFT), and/or a risk reduction factor (RRF).

In one process embodiment, the RRF may be given as a desired goal, and the process may use N-step predictive techniques to progressively derive future reliability measures that meet the desired RRF. Accordingly, a more optimal proof test schedule may be derived, suitable for meeting the desired RRF. A process is also provided, suitable for using the model library to derive a variety of maintenance, operational, and/or economic actions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
   a processor configured to execute a model library to model a safety system, wherein the model library comprises a plurality of subsystem models, and each of the plurality of subsystem models is configured to derive a reliability measure;
   a heat recovery steam generator (HRSG); and
   an HRSG advisory system executable by the processor and configured to:
      receive one or more condition monitoring algorithm results comprising closed loop processor monitoring algorithm results derived using at least one of the following: auto correlation function (ACF), relative damping index (RDI), stiction index (SI), non-Gaussanity index (NGI), or non-linearity index (NLI);
      receive one or more measurements; and
      determine a probability of failure for the HRSG based at least in part on the one or more condition monitoring algorithm results, the one or more measurements, the model library, or a combination thereof, wherein determining the probability of failure comprises determining a most likely state of a plurality of states of the HRSG.

2. The system of claim 1, wherein the HRSG advisory system is configured to provide controller tuning recommendations based on the one or more condition monitoring algorithm results.

3. The system of claim 1, wherein the HRSG advisory system is configured to receive historical data relating to the controller used to operate the HRSG.

4. The system of claim 3, wherein the historical data comprises documented failures in the HRSG.

5. The system of claim 1 comprising:
   a dynamic risk calculation engine (DRCE) having the HRSG advisory system, wherein the DRCE is configured to use a user-defined set of the plurality of subsystem models, a fault tolerance input, and a maintenance policy input, to derive a system risk for an apparatus.

6. The system of claim 5, wherein each of the plurality of subsystem models comprises an X-out-of-N(XooN) Markov model configured to use a plurality of Markov states and Markov state transitions to model the reliability measure.

7. The system of claim 5, wherein the fault tolerance input comprises a risk reduction factor (RRF), and the safety system comprises a safety instrumented function (SIF).

8. The system of claim 5, wherein the DRCE is configured to command a proof test for the system based on the system risk.

9. The system of claim 8, wherein the DRCE is configured to monitor the proof test to update the system risk.

10. The system of claim 5, wherein the DRCE is configured to use an alarm, a partial proof test, a full proof test, an operational event, a maintenance event, or a combination thereof, to derive a reliability credit, and wherein the reliability credit is used to update the system risk.

11. The system of claim 1, wherein the system risk is configured to be provided as input to an optimization system for the derivation of a maintenance action, an operational action, an economic action, an environmental action, or a combination thereof.

12. A method comprising:
   receiving, at a processor, one or more condition monitoring algorithm results comprising closed loop processor monitoring algorithm results derived using at least one of the following: auto correlation function (ACF), relative damping index (RDI), stiction index (SI), non-Gaussanity index (NGI), or non-linearity index (NLI);
   predicting, using the processor, a plurality of state probabilities for a heat recovery steam generator (HRSG) system based at least in part on a model library and the one or more condition monitoring algorithm results, wherein the model library comprises one or more subsystem models, and each of the one or more subsystem models is configured to derive a reliability measure;
   computing, using the processor, a system probability of failure on demand (PFD);
   if an N-step ahead estimate of the PFD exceeds a risk reduction factor (RRF), then commanding a proof test; and
   outputting a proof test schedule.

13. The method of claim 12, wherein each of one or more subsystem models comprises an X-out-of-N Markov model configured to use a plurality of states and state transitions to model the reliability measure.

14. The method of claim 12, comprising monitoring the system via sensors, wherein the monitoring is used to update the plurality of state probabilities for the system.

15. A system comprising:

a controller configured to control a machine system comprising a heat recovery steam generator (HRSG) system, wherein the controller is configured to receive inputs from the HRSG system, wherein the controller comprises non-transitory computer-readable medium comprising instructions configured to:

receive one or more condition monitoring algorithm results comprising closed loop processor monitoring algorithm results derived using at least one of the following: auto correlation function (ACF), relative damping index (RDI), stiction index (SI), non-Gaussanity index (NGI), or non-linearity index (NLI);

predict a plurality of state probabilities for the HRSG system based on a model library configured to derive a reliability measure;

compute a system probability of failure on demand (PFD) based at least in part on the one or more condition monitoring algorithm results;

if an N-step ahead estimate of the PFD exceeds a risk reduction factor (RRF), then commanding a proof test; and output a proof test schedule.

16. The system of claim 15, wherein the library model comprises one or more subsystem models, wherein the controller comprises a graphical user interface (GUI) configured to graphically display the one or more subsystem models, and wherein a user-selected set of the one or more subsystem models may be connected in series, in parallel, or a combination thereof, to construct a safety instrumented function (SIF).

17. The system of claim 16, wherein the one or more subsystem models comprises a boiler system model for a boiler system present in the HRSG system.

18. The system of claim 15, wherein each of the one or more subsystem models comprises an X-out-of-N(XooN) Markov model configured to use a plurality of states and state transitions to model the reliability measure.

* * * * *